Nov. 21, 1933.  G. A. BELDING  1,936,079
JOINING FLUID CONVEYERS
Filed Oct. 9, 1931   2 Sheets-Sheet 1
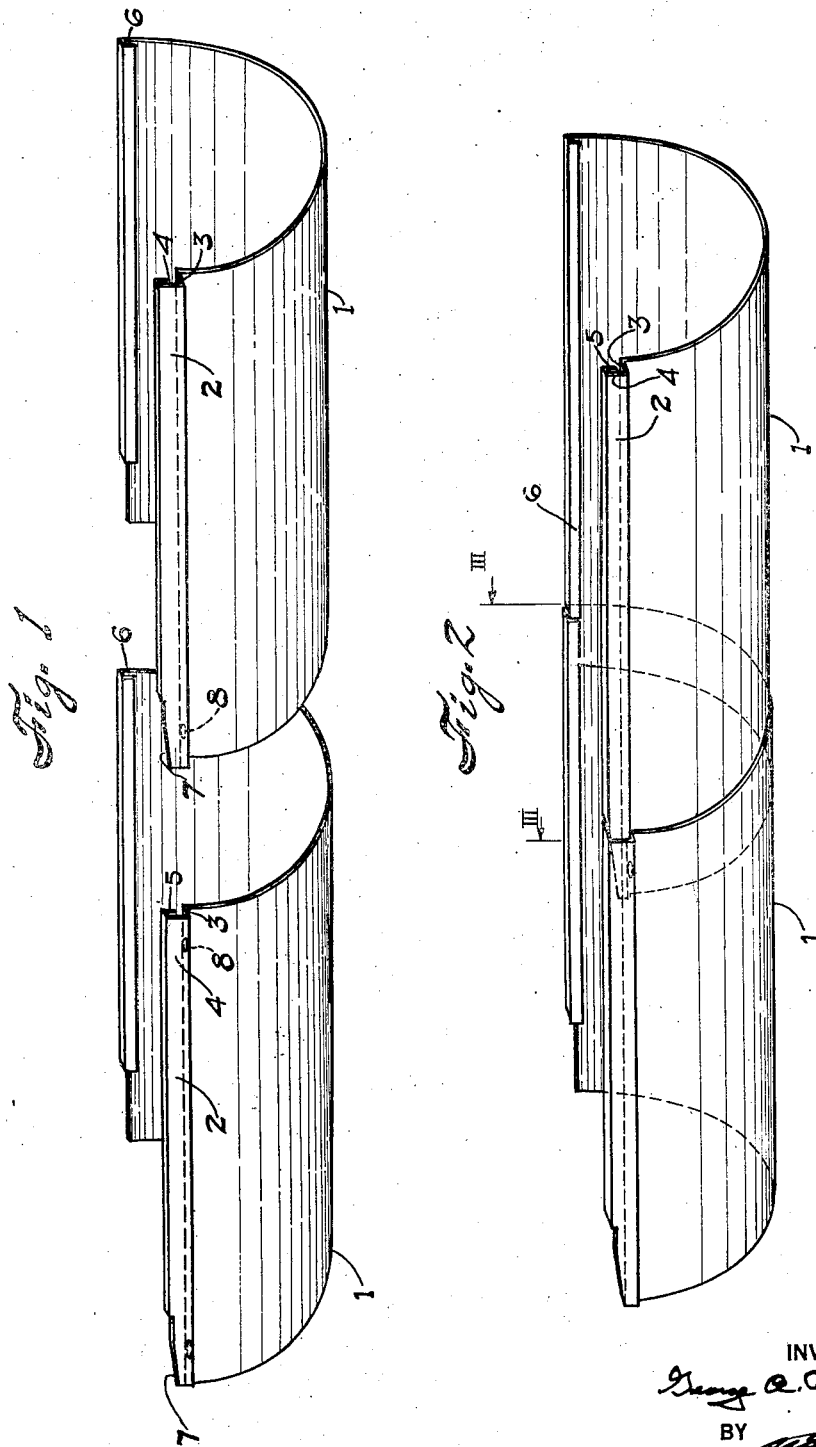

Nov. 21, 1933.   G. A. BELDING   1,936,079
JOINING FLUID CONVEYERS
Filed Oct. 9, 1931   2 Sheets-Sheet 2
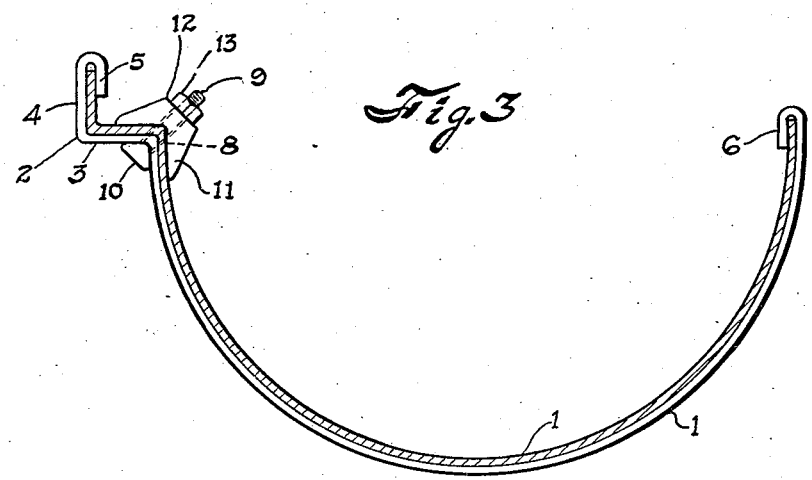
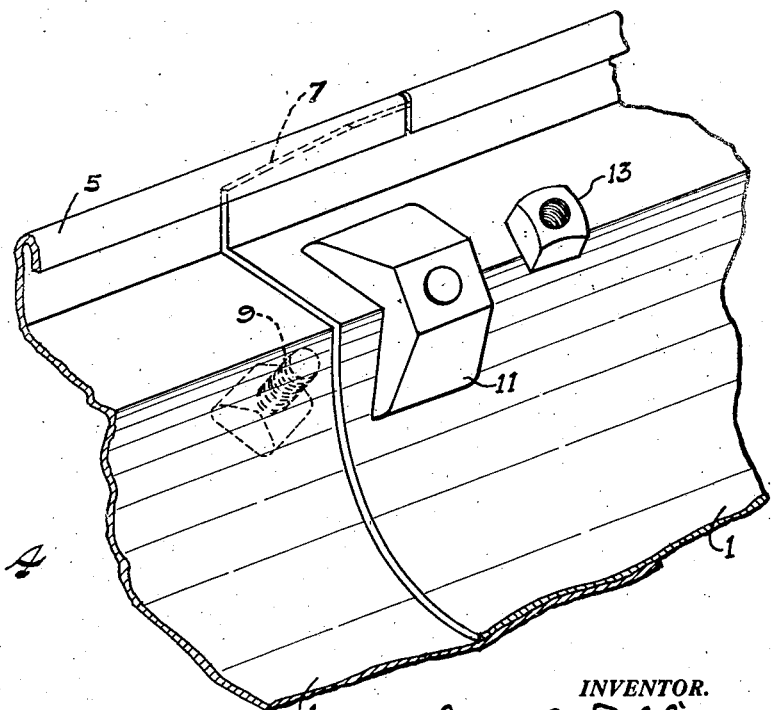
INVENTOR.
George A. Belding
BY
ATTORNEY.

Patented Nov. 21, 1933

1,936,079

UNITED STATES PATENT OFFICE 1,936,079

JOINING FLUID CONVEYERS

George A. Belding, Mount Lebanon, Pa.

Application October 9, 1931. Serial No. 567,792

6 Claims. (Cl. 108—28)

This invention has relation to eaves-troughs, flumes, and like fluid conveyers provided with fluid-tight joints.

Heretofore, eaves-trough and flume sections have usually been joined together by means of lap or slip joints. When slip joints are used the sections are provided at one end with a sleeve formed by double bending back upon itself a portion of the metal. The opposite end of the section is left plain, and the joint or coupling between two such sections is formed by inserting the plain end of one section into the sleeve-formed end of another section. The efficiency of joints of this nature is dependent greatly upon the accuracy of the workmanship involved in their construction and mounting, and, furthermore, no positive clamping member or appliance is provided to insure a water-tight joint.

In prior lap joints two eaves-trough or flume sections, having plain ends, are arranged in overlapping relationship and thereafter clamped together to form a water-tight joint by means of coupling straps and suitable fastening devices such as nuts and bolts, or rivets, or are joined by soldering. It has also been a customary practice to incorporate a lap joint between two such sections within the supporting means or hanger, as is well known to those versed in this particular art.

The present invention is directed towards overcoming the disadvantages and cumbersome constructions incorporated in prior joints of this nature and has for an object the provision of a joint construction of simplified and economical design incorporating a minimum number of parts and insuring a liquid-tight union between adjacent sections.

Another object of the invention is the provision of a joint construction for eaves-trough or flume sections which requires a minimum amount of skill and labor to assemble.

A further object of the invention is the provision of a joint which allows sections of eaves-trough or flume or similar fluid conveyers to be joined together securely at any desired point even if that point be intermediate the supports from which the installed conveyer is suspended.

Various other objects will present themselves on consideration of the following description, appended claims and accompanying drawings in which:

Fig. 1 represents a perspective view of two sections of eaves-trough prior to their association in lap joint relationship;

Fig. 2 represents a perspective view of eaves-trough sections which have been joined together;

Fig. 3 represents a vertical section taken on the line III—III in Fig. 2;

Fig. 4 represents a fragmentary perspective view of the co-acting clamping elements, partly separated to more clearly show their mode of assembly.

In describing my improved form of joint construction, I have elected to disclose it in connection with a particular form of eaves-trough, but it will be understood that the invention is readily adaptable to various other forms of fluid-conveying systems, such as flumes, etc., with equally good results.

Referring to the drawings, 1 designates eaves-trough sections of semi-circular form, the front edge of each being provided with a bead or flange 2 formed by bending the material of the eaves-trough outwardly, as at 3, and upwardly, as at 4, in angular formation, the upwardly extending portion 4 of the flange being doubled back or folded over upon itself, as at 5, to form a finished edge of double thickness along the flange 2. The opposite or rear edge of each eaves-trough section is finished by means of a folded-over or hook-shaped portion 6 at substantially the same elevation as the aforementioned portion 5.

At one end of each section of eaves-trough or gutter, the folded-over or hook-shaped portion 6 of the rear edge is removed or cut away as is also the doubled-back portion 5 of the upwardly extending portion 4 of the flange 2. The upwardly extending portion 4 is also, in the preferred form of my invention, tapered as shown at 7. The removal from one end of the eaves-trough section of the lengths of doubled-back material 5 and 6 and the provision of the taper 7 are so performed that the end of the section thus formed may be inserted into a plain end of another section of eaves-trough (as shown to best advantage in Figs. 2 and 3), whereby a joint is formed between two sections, the extent of the overlap in such a joint being governed by the length of material removed from the doubled-back portions 5 and 6.

Referring more particularly to Figs. 2 and 3, two sections 1 of eaves-trough, which have been overlapped a suitable distance, as above described, are provided with a hole or aperture 8 which may be previously formed in each individual section or formed in the two sections simultaneously after assembly. A fastening element in the form of a bolt 9, the head 10 of which is of prismoidal form, is inserted through the opening 8 so that the head 10 conforms with the angle or corner formed between the lower surface 3 of the flange 2 and the outer adjacent surface of the body portion of the eaves-trough section. An angular washer 11 of such form as to conform closely with the top surface of the horizontally extending portion 3 of the flange 2 and the inner adjacent surface of the upper eaves-trough section is placed over the shank of the bolt 9. The washer 11 is provided with a nut-bearing surface 12 upon which bears the nut 13, threaded onto the shank of bolt 9 to complete the fastening of the overlapped sections.

It will be seen that when two sections of trough are assembled with the clamping arrangement in the manner just described, the simple operation of tightening the nut 13 serves to draw the two sections into close conformity throughout the entire area defined by their overlapping edges. The action of the clamping device may best be seen in Fig. 3. Because of the angle of inclination of the axis of bolt 9, and the prismoidal form of the head 10 of this bolt, the tightening of nut 13 serves simultaneously to draw the lower surfaces 3, 3 of flanges 2, 2 and the surfaces of the body portions of the eaves-trough sections into juxtaposition. The hook engagement provided by the folded-over or hook-shaped portion 6 of the rearward edge of the trough is at the same time drawn tightly against the rearward edge of the adjacent section. A liquid-tight seal is thus effected throughout the entire distance between the hook engagement at 6 and the flanges 2.

The prismoidal form of the head 10 of bolt 9 produces the further advantage that the bolt is prevented from turning by its engagement with the corner formed by the intersection of the flange 2 with the body portion of the trough. On tightening the nut 13 the prismoidal bolt head 10 and the angular washer 11 co-act to produce the angle of inclination of the axis of bolt 9 hereinbefore referred to. I prefer that the axis of bolt 9 should bisect the angle formed by the meeting portions of flange 2 and the body portion of the trough, but this is not strictly essential. The bolt should, however, be angularly disposed with reference to both the flange 2 and the meeting portion of the body so that both are drawn into juxtaposition with the corresponding portions of the adjacent trough section. The flat faces presented by the head 10 of the bolt 9 prevent retrograde movement of the fastening device and the possible subsequent loosening of the joint.

My improved form of joint construction may be used to join sections of fluid conveyers at any point in their construction since the joint is of unitary construction and does not require the cooperation of the suspension element, or hanger, as a part thereof. It is also apparent that the joint is adaptable to flume sections, and whether used in conjunction with flumes or eaves-troughs the joint does not interfere with the use of the standard forms of supporting means and circular hangers, nor is the joint dependent upon such hangers for its efficiency.

Having thus described and explained my invention and its manner of operation it is to be understood that the particular apparatus described was selected merely for purposes of illustration and that variations in the form and arrangement of parts shown and described herein may be made without departing from the nature and scope of this invention except as set forth in the appended claims.

What I claim is:

1. A joint between overlapped sections of a fluid conveyer, said sections at the point of overlap having at one longitudinal edge portion a hook engagement one with the other and at the opposite longitudinal edge portion being provided with overlapping outwardly extending flanges, and a clamping element having a head provided with angular bearing faces adapted to be drawn into the angle formed between the said flange and the body portion of one of the said fluid conveyer sections, whereby said clamping element serves to draw said hook-engaged longitudinal edge portions into juxtaposition.

2. A clamping device for flanged fluid conveyers which comprises a bolt, the head of which is adapted to conform with the corner formed by the juncture of the flange with the body portion of the eaves-trough whereby the flanges and body portions of overlapping adjacent sections of eaves-trough may be simultaneously drawn into juxtaposition.

3. In a fluid conveyer joint, overlapped flanged fluid conveyer sections, said sections at the point of overlap being interengaged at one longitudinal edge portion thereof and the flanges interengaged at an opposite longitudinal edge portion thereof, a clamping appliance which comprises a headed bolt projecting through said overlapped sections and disposed in a plane substantially bisecting the angle formed between the flange and body portion of the fluid conveyer, and a washer surrounding said bolt adapted to embrace the overlapped flanges between the head of the bolt and a nut threaded on to said bolt, whereby the overlapped sections are securely held in liquid-tight relationship.

4. A fluid conveyer joint comprising overlapped sections of semi-circular fluid conveyer, said sections at the point of overlap having one longitudinal edge portion in hook engagement one with the other, and at the opposite longitudinal edge portion overlapping and interengaging flanges, said flanges extending outwardly from the body portions of the semi-circular sections, and a clamping device comprising a bolt member inserted through the overlapping sections, said bolt member being provided with a prismoidal head which conforms with the angle formed between the under surface of the outwardly extending flange and the outer surface of the body portion of the lowermost fluid conveyer section, an angular washer adapted to surround the bolt member and engage the top surface of the flange and inner surface of the body portion of the uppermost fluid conveyer section, and a nut adapted to be threaded on to said bolt member into contact with said washer, whereby the overlapped fluid conveyer sections are drawn into liquid-tight sealing relationship over their area of contact.

5. A joint between overlapped sections of a fluid conveyer, said sections at the point of overlap having a hook engagement one with the other at one longitudinal edge portion thereof and outwardly extending overlapping flanges at the opposite longitudinal edge portion thereof, and a clamping member disposed in a plane substantially bisecting the angle formed between the outwardly extending flanges and the body portions of said overlapping sections, whereby the overlapped sections are drawn into close contact over their area of contact.

6. A joint between overlapped sections of a fluid conveyer, said sections at the point of overlap having a hook engagement one with the other at one longitudinal edge portion thereof and outwardly extending overlapping flanges at the opposite longitudinal edge portion thereof, and a clamping means comprising a bolt and nut connection disposed in a plane substantially bisecting the angle formed between the outwardly extending flanges and the body portions of said overlapping sections, whereby the overlapped sections are drawn into close contact over their area of contact.

GEORGE A. BELDING.